UNITED STATES PATENT OFFICE.

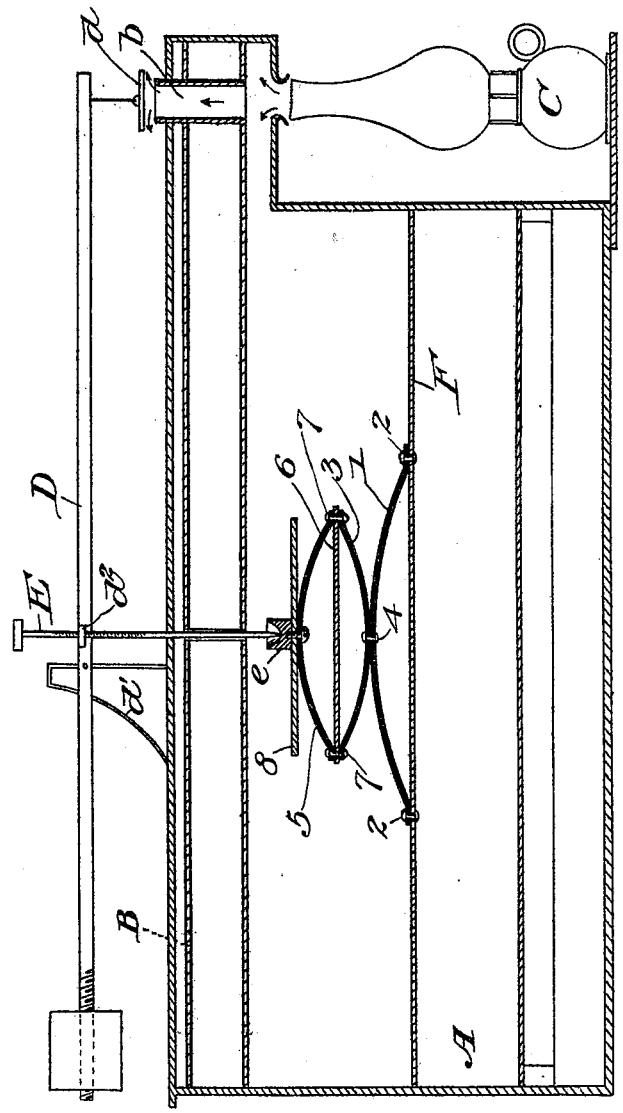

MANANDER MOTT JOHNSON, OF CLAY CENTRE, NEBRASKA.

THERMOSTATIC GOVERNOR FOR INCUBATORS.

SPECIFICATION forming part of Letters Patent No. 643,508, dated February 13, 1900.

Application filed February 21, 1899. Serial No. 706,372. (No model.)

*To all whom it may concern:*

Be it known that I, MANANDER MOTT JOHNSON, a citizen of the United States, residing at Clay Centre, in the county of Clay and State of Nebraska, have invented certain new and useful Improvements in Thermostatic Governors or Heat-Regulators for Incubators; and I do declare the following to be a full, clear, and exact description of the invention, such as will enable others skilled in the art to which it appertains to make and use the same.

My invention relates to improvements in thermostatic heat-governors for incubators; and the object is to provide a simple, inexpensive, and reliable device for this purpose.

To this end the invention consists in the construction, combination, and arrangement of the device, as will be hereinafter more fully described, and particularly pointed out in the claim.

The figure in the drawing is a vertical longitudinal section, partly in elevation, of an incubator, showing my improved thermostat in position.

In the drawing, A represents the incubator; B, the hot-water tank, one end of which is provided with a vertical flue $b$, which is alined with the lamp C, and $d$ denotes the flue-damper, carried by the horizontal lever D, fulcrumed in the bracket $d'$, fixed on top of the incubator.

E represents the adjusting-screw, which is mounted in a correspondingly-threaded orifice in the lateral arm $d^2$, carried by the lever D.

F denotes a horizontal brace or partition fixed to the end walls of the incubator, and 1 denotes a convex or semi-elliptical strip of vulcanized rubber secured to the brace F by the screws 2 2.

3 denotes an oppositely-bowed strip of the same material mounted above the strip 1, with their meeting surfaces connected by a rivet 4.

5 denotes a reversely-bowed rubber strip, and 6 an interposed strip of seasoned wood, the outer ends of the rubber strips 3 and 5 and the interposed strip being fastened together by the rivets 7 7.

8 denotes a heat-deflector plate resting on top of the bowed rubber strip 5 and secured thereto. The lower end of the adjusting-screw E terminates in a center point, which has a bearing in the step-socket $e$, fixed to the deflector-plate 8, thus preventing the possibility of the adjusting-screw binding, due to the action of the thermostat.

Should the temperature of the egg-chamber increase above the normal point, the increased degree of heat will tend to expand the rubber strips longitudinally, and as their ends are fixed against longitudinal movement they expand laterally, and this movement is communicated to the lever D through the adjusting-screw E, which raises the damper and permits the heat to escape. As the egg-chamber starts to cool down the lower temperature tends to contract the bowed rubber strips, which resume their normal position and lower the damper, thereby deflecting the heat into the incubator.

A very important feature of my device is the deflector-plate 8, which, as will be observed, is placed between the heated tank B and the thermostat, so as to prevent the heat from the tank acting directly on the thermostat.

The brace F is located in the same plane with the bottom of the egg-tray, and consequently the thermostat lies in the same heat zone in which the eggs are placed, and so it is affected by and is responsive to the same degree of heat to which the eggs are subjected.

Without the deflector-plate the heat radiated from the tank would act directly on the upper part of the thermostat before it reached the eggs; but by reason of the interposed deflector-plate the heat is caused to pass around the said plate, and thus act upon the thermostat and eggs equally.

It will of course be understood that various changes in the form, proportion, and the minor details of construction may be resorted to without departing from the principle or sacrificing any of the advantages of this invention.

Having thus described the invention, what is claimed, and desired to be secured by Letters Patent, is—

The herein-described thermostatic governor for incubators, comprising the convex rubber strip 1, in combination with the superimposed and oppositely-bowed rubber strips 3 and 5 and the interposed wooden strip 6 having their contiguous ends fixed together;

the deflector-plate S and the step-socket $e$ fixed to the bowed strip 5; the lever D provided with the flue-damper $d$ and lateral arm $d^2$ and fulcrumed in the bracket $d'$ on the incubator-top, and the damper-regulating screw E mounted in a threaded orifice in said lateral arm $d^2$ of lever D; substantially as specified.

In testimony whereof I have hereunto set my hand in presence of two subscribing witnesses.

MANANDER MOTT JOHNSON.

Witnesses:
   LEE BURLINGAME,
   O. P. SHOEMAKER.